Patented Jan. 18, 1944

2,339,294

UNITED STATES PATENT OFFICE 2,339,294

TILE AND METHOD OF PREPARING THE SAME

James N. Roche, Pittsburgh, and Ernest B. Kester, Forest Hills, Pa., assignors to Koppers Company, Pittsburgh, Pa., a corporation of Delaware No Drawing. Application April 27, 1940, Serial No. 332,075

11 Claims. (Cl. 260—18)

This invention relates to floor tiles and processes of preparing the same. More particularly the invention relates to floor tiles prepared from resinous materials obtained by reacting fatty material, such as vegetable and animal oils, fats and waxes, with a naphthalene-formaldehyde condensation product.

An object of the present invention is to provide a tile that is highly resistant to the effects of certain chemicals and that has certain outstanding characteristics that render it particularly useful for surfacing floors.

An essential component of the tile is a resinous material prepared by heating a mixture comprising a fatty acid composition and a resin prepared from naphthalene and aldehyde until the fatty acid composition and the resin have completely reacted or substantially so with each other. The naphthalene resin used in the reaction is preferably preformed from pure solid naphthalene or from the press cake which is obtained by filtering crystallized naphthalene from a fraction of coal tar obtained by distillation between approximately 180° and 250° C. It has been found satisfactory to use this naphthalene fraction as such, preferably free from phenol.

In preparing the naphthalene condensation product, the naphthalene and formaldehyde are reacted preferably in the presence of an acid catalyst, which may be either sulphuric acid or phosphoric acid $H_3PO_4$. The naphthalene condensation product may be prepared also by reacting naphthalene with paraformaldehyde in the presence of zinc chloride. In the former case, the acid is preferably completely removed from the naphthalene-aldehyde resin before reacting it with a fatty material. Also water or moisture is preferably completely removed therefrom. The softening point of the naphthalene condensation product employed in the reaction with a fatty material may be as low as 70° C. or somewhat lower, and as high as 120° C. or somewhat higher, and in this range.

Drying oils, semi-drying oils, non-drying oils, animal or vegetable oils, fats or waxes either individually or mixtures of two or more thereof may be employed in the reaction with the naphthalene-aldehyde resin. For instance, linseed oil (boiled or raw), tung oil, soybean oil, oiticica oil (oxidized or unoxidized), cotton-seed oil, cocoanut oil, castor oil, menhaden oil, whale oil, oleic acid, stearic acid, and spermaceti are found useful. Of these, the drying oils give highly desirable results and oiticica oil is particularly preferable. Unsaturation in oils tends to increase the speed of reaction with naphthalene resins.

Oil polymers (such as oiticica oil gel or tung oil gel), Petrexes (drying oil-extended alkyd resin prepared by reacting maleic anhydride with a conjugated terpene such as terpinene to give a dibasic acid which in turn is reacted with glycerol and a drying oil), synthetic glyceride-type drying oils, and chlorinated drying oils or other artificially modified oils such as dehydrated castor oil may be reacted with the naphthalene condensation product.

The reaction of the naphthalene resin with a fat may best be carried out in an atmosphere of an inert gas such as carbon dioxide to minimize oxidation effects, but this is not essential.

By way of illustration, a naphthalene condensation product for use in the preparation of the resin employed in the present invention may be prepared as follows:

About 12 parts of sulphuric acid (66° Bé.) are gradually added to and stirred into about 12 parts of commercial formalin (40% solution of formaldehyde) while the mixture is being cooled. About 18 parts of naphthalene pressed cake (melting point about 78° C.) are added to the above mixture while being stirred and heated preferably with steam or hot water to approximately 83° C. at which point a reaction between naphthalene and formaldehyde begins. The temperature rises spontaneously and is preferably maintained at about 105° to 110° C. until the polymerized product attains a melting point above about 75° C. After about 2¾ hours the melting point of the resulting resin is about 102° C. If desired, the heating may be continued until the load on the motor used for stirring begins to rise as indicated by ammeter readings. This is generally an indication that all of the naphthalene has reacted and polymerization of the initially formed resin is proceeding.

The resulting mass is then forced through lead covered rolls into cold water whereupon the resin product becomes solid. The water dissolves a substantial portion of the acid remaining in the resin. The acid is more completely removed by grinding the resin until a substantial proportion passes through a 28 mesh screen, and then thoroughly washing the ground material until substantially all of the free acid is removed. Any traces of acid are removed by wetting the resin and agitating it with dilute alkali slightly in excess of the acid equivalent present. The sulphate formed is washed out by further agitation in water whereafter the separated resin is dried by heating until all the water is vaporized.

The napthalene resin is now ready for use in the preparation of the resin employed in the present invention. The latter resin is prepared, for example, as follows:

About 700 parts of a formaldehyde-naphthalene resin (softening point about 109° C.), preferably freed from acid or salt of the acid and from water, are mixed with about 300 parts of oiticica oil and heated in an atmosphere of carbon dioxide in about 15 minutes to about 280° C. while being stirred. Heating is continued slowly to prevent foaming. At about 310° C. when the mixture is found to be clear by a spot test, the heating is discontinued. The softening point of the resulting resin is about 78.5° C.

Another naphthalene-aldehyde-fat resin is prepared as follows:

About 80 parts of a napthalene-formaldehyde resin (softening point about 106° C.) are heated with about 20 parts of tung oil at about 350° to about 360° C. for about 5 minutes at the end of which time the resulting material spots clear on a cold surface. The softening point of the resulting resin is about 75° C.

Still another napthalene-aldehyde-fat resin is prepared as follows:

About 83 parts of a naphthalene-formaldehyde resin (softening point about 98° C.) are heated with about 17 parts of linseed oil at a temperature of about 330° C. for about 10 minutes. The resin spots clear at the end of this time and is permitted to cool. The softening point of the resulting resin is about 73° C.

The napthalene-aldehyde-fat resin employed in the tile has a softening point of preferably from about 73° C. to about 80° C. About 28 to 35% is used in a tile mix of fibrous material and pigment. The tile mix may contain about 55 to 67% fibrous material and about 5 to 10% pigment.

The fibrous material may be either long- or short-fiber asbestos or preferably a mixture of the two. An amount of cotton linters substituted for an equal weight of the asbestos fiber added to the mix results in a stronger tile, particularly from the standpoint of flexure strength.

The pigment may be materials such as Prussian blue, chrome yellow, orange or green, ochre, smalt (blue glass or cobalt glass), titanium oxide, carbon black or mixtures of these, and others.

For the purpose of illustrating the invention, the following examples are provided:

*Example 1.*—About 35 parts of a resin (softening point about 76° C.) prepared by reacting a naphthalene formaldehyde condensation product with a fatty acid composition such as oiticica oil and heating to obtain a homogeneous, clear, viscous liquid, are compounded in a rubber mill, while being heated around 115° to 120° C., with about 42 parts of asbestos (long fibers), about 13 parts of asbestos floats (short fibers), and about 10 parts of a pigment. It is important that the fibers of the fibrous material be completely coated with the resin. The resulting mix is then rolled out into sheets on calender rolls at a somewhat lower temperature to prevent sticking. The sheets are permitted to cool on a flat surface and then cut or sawed to the desired shape and size. The finished tile may be preferably about ⅛ to ⅜ inch thick.

*Example 2.*—A tile mix is prepared in the manner described in Example 1 from about 35 parts of a napthalene-aldehyde-fat resin (softening point about 78° C.), about 13 parts of asbestos floats, about 21 parts of cotton linters, about 21 parts of long-fiber asbestos, and about 10 parts of pigment. The finished tile is formed in the manner described in Example 1.

*Example 3.*—A tile mix is prepared from about 30 parts of a naphthalene-aldehyde-fat resin (softening point about 73° to 80° C.), about 18 parts of asbestos floats, about 42 parts of long-fiber asbestos, and about 10 parts of pigment. The tile is prepared in accordance with the procedure outlined in Example 1.

Proportions of substances mentioned herein are in parts by weight throughout.

The following table indicates the results obtained in indentation tests on tiles prepared by the procedures set forth in the above examples. A comparison with Federal stock catalog specifications is incidentally provided.

|  | 77° F. 1 min. | 77° F. 10 min. | Govt. maximum 77° F./10 min. | 115° F. 30 sec. | Govt. maximum 115° F./30 sec. |
|---|---|---|---|---|---|
| Example 1: Indentation of ¼″ ball under 30 pound load | 0.010 | 0.014 | 0.0149 | 0.030 | 0.038 |
| Example 2: Tested as in Example 1 | 0.009 | 0.011 | 0.0137 | 0.024 | 0.038 |
| Example 3: Tested as in Example 1 | 0.010 | 0.014 | 0.0149 | 0.038 | 0.038 |

In comparisons of the tile of the present invention with other tiles on the market, it was found by actual tests that the former is far superior to the latter in many rsepects. For instance, in determining the effects of certain chemicals on a tile it was found that the herein-described tile is less affected than other tiles. Comparisons were made with alkaline solutions such as a 5% sodium phosphate solution in water and a 5% sodium hydroxide solution in water, and with solvents such as petroleum ether. The tiles tested were placed in the above liquids at uniform temperatures of around 30° to 40° C. At twenty-four hour intervals during a period of as long as two weeks, where feasible, each tile was tested for indentation, change in weight, and change in thickness. It was found that in the case of the tile herein described the differences between the values obtained, at any two successive intervals, for the per cent gain in weight, the per cent gain in thickness, and the indentation with a one-quarter inch ball under a thirty pound load at 77° F., were relatively small.

In the indentation tests, whereas in some instances tiles other than the tile defined herein shattered or became too soft before the end of a week, in all other instances indentations at the end of the given period were considerably less for the latter tile than for the former. In the tests to determine change in weight as effected by subjection to the above chemicals, in the case of each of the above chemicals, the changes in weight in the case of tiles previously in use were far greater than in the case of the present tile and in fact the effects produced on the former tile were far more destructive.

In the tests to determine the change in thickness of the tiles as produced by the above-mentioned chemicals, in the case of sodium phosphate the percent gain in thickness of the present tile was relatively small whereas the per cent gain in thickness in other tiles for the same period was about five times that produced in the present tile. In the change-in-thickness tests with sodium hydroxide, while the per cent gain in thickness in the present tile increased to a relatively small extent from day to day, the increase was much greater in other tiles over the same period. The same was true in the tests with petroleum ether. It was noted in the petroleum ether-change-in-thickness-tests that for a period of about five days there was no change in thickness in the tile of the present invention whereas the thicknesses of other tiles were considerably changed before the end of the first day of the above period.

In addition to having the characteristics pointed out above, the tile of the present invention is highly resistant to wear and indentation within the range of temperatures of the atmosphere. The latter tile is solid, hard and extremely coherent and yet it is of such plasticity that when attached to a base it readily adjusts itself to any unevenness in the surface of the base.

Resins prepared by reacting phenol with naphthalene formaldehyde condensation products with or without addition of oils mentioned herein, may be used in floor tiles but for the purposes of the present invention the reaction product of an oil with such condensation products is preferred.

What is claimed is:

1. A tile consisting of a solid coherent plate comprising a mixture of pigment and fibrous material the fibers of which are coated with a resin formed by reacting naphthalene-formaldehyde resin essentially with a fatty oil.

2. A tile consisting of a solid coherent plate comprising a mixture of pigment and fibrous material the fibers of which are coated with a resin formed by reacting naphthalene-formaldehyde resin essentially with a drying oil.

3. A tile consisting of a solid coherent plate comprising a mixture of pigment and fibrous material, the fibers of which are coated with a resin formed by reacting naphthalene-formaldehyde resin essentially with oiticica oil.

4. A tile consisting of a solid coherent plate comprising a mixture of pigment and fibrous material, the fibers of which are coated with a resin formed by reacting naphthalene-formaldehyde resin essentially with linseed oil.

5. A tile consisting of a solid coherent plate comprising a mixture of pigment and fibrous material, the fibers of which are coated with a resin formed by reacting naphthalene-formaldehyde resin essentially with tung oil.

6. A tile consisting of a solid coherent plate comprising a mixture of pigment and fibrous asbestos the fibers of which are coated with a resin formed by reacting naphthalene-formaldehyde resin essentially with a fatty oil.

7. A tile consisting of a solid coherent plate comprising a mixture of pigment and fibrous asbestos the fibers of which are coated with a resin formed by reacting naphthalene-formaldehyde resin essentially with a drying oil.

8. A tile consisting of a solid coherent plate comprising a mixture of pigment, asbestos fibers and cotton linters, the fibers and linters being completely coated with a resin formed by reacting naphthalene formaldehyde resin essentially with a drying oil.

9. A tile for attachment to a base, the said tile consisting of a solid coherent plate comprising a uniform mixture of about 10 per cent pigment, about 55 to 62 per cent fibrous material and about 28 to 35 per cent of resin formed by reacting naphthalene-formaldehyde resin essentially with a fatty oil, the said resin having a softening point of from about 73° C. to about 80° C. and coating completely the fibers of the said fibrous material, and the said plate being highly resistant to indentation and yet having a plasticity that permits it to adjust itself readily to the unevenness of a base to which it is attached.

10. A floor tile consisting of a solid coherent plate comprising a mixture of about 5 to 10 per cent pigment, about 55 to 67 per cent fibrous material and about 28 to 35 per cent of resin formed by reacting a naphthalene-formaldehyde condensation product essentially with a drying oil, the said resin having a softening point of from about 73° C. to about 80° C. and coating the fibers of the said fibrous material, the said plate being resistant to alkaline agents and to solvent to the extent that when exposed to such agents and solvent over a given period of days the differences at successive equal intervals in per cent gains in weight, the per cent gains in thickness, and in indentation of a one-quarter inch ball under a thirty pound load at 77° F., are relatively small.

11. A process of manufacturing a tile, which comprises heating a resin formed by reacting a naphthalene-formaldehyde condensation product essentially with a fatty oil to obtain a homogeneous, clear, viscous liquid; mixing about 28 to 35 parts by weight of the said liquid with 5 to 10 parts by weight of pigment and about 55 to 67 parts by weight of fibrous material and completely coating the fibers of the said material with the said liquid, and forming tile from the resulting mixture.

JAMES N. ROCHE.
ERNEST B. KESTER.